United States Patent
Fry et al.

(10) Patent No.: US 7,489,925 B2
(45) Date of Patent: Feb. 10, 2009

(54) METHOD AND APPARATUS FOR AUTOMATICALLY SENDING A CAPTURED IMAGE TO A PHONE CALL PARTICIPANT

(75) Inventors: Ryan C. Fry, Portsmouth, NH (US); Robert P. Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 235 days.

(21) Appl. No.: 10/884,250

(22) Filed: Jul. 1, 2004

(65) Prior Publication Data
US 2006/0003761 A1  Jan. 5, 2006

(51) Int. Cl.
*H04Q 7/20* (2006.01)

(52) U.S. Cl. .................. 455/426.1; 455/414.1; 455/445; 455/461; 455/556.1; 370/352

(58) Field of Classification Search ............. 455/412.1, 455/445, 461, 426.1, 414.1, 426.2, 556.1; 370/352; 710/24; 348/14; 700/94
See application file for complete search history.

(56) References Cited

U.S. PATENT DOCUMENTS 5,978,806 A    11/1999  Lund
2004/0005915 A1* 1/2004 Hunter ................. 455/575.1
2004/0062374 A1* 4/2004 Lund .................... 379/218.01
2004/0131282 A1* 7/2004 Yoshida et al. .......... 382/312
2004/0141594 A1   7/2004 Brunson et al.
2004/0172455 A1   9/2004 Green et al.
2004/0172456 A1   9/2004 Green et al.
2004/0203608 A1* 10/2004 Osann, Jr. ............... 455/412.1
2004/0240434 A1* 12/2004 Sato et al. ................ 370/352
2005/0078172 A1*  4/2005 Harville et al. .......... 348/14.09
2005/0100159 A1   5/2005 Fink et al.
2005/0138235 A1*  6/2005 Khan et al. ................. 710/24
2005/0166154 A1   7/2005 Wilson et al.
2005/0193117 A1   9/2005 Morris
2005/0250534 A1* 11/2005 Maurer ................... 455/556.1
2006/0149399 A1*  7/2006 Norhammar et al. ......... 700/94
2006/0233338 A1  10/2006 Punaganti

* cited by examiner

*Primary Examiner*—Charles N Appiah
*Assistant Examiner*—Michael T Vu (57) ABSTRACT

A method for automatically sending a captured data to a phone call participant using a communication device having a data capture apparatus, includes initiating a communication session to a participant, such as a phone call; initiating a data capture event during the communication session, such as capturing an image; and automatically transmitting the captured data to the participant concurrently with the communication session.

32 Claims, 4 Drawing Sheets

METHOD AND APPARATUS FOR AUTOMATICALLY SENDING A CAPTURED IMAGE TO A PHONE CALL PARTICIPANT

CROSS-REFERENCE TO RELATED APPLICATIONS

The present invention is related to patent application Ser. No. 10/774,229, entitled "Method and System for Transmitting Data Utilizing a Plurality Of Communication Modes in a Communication Device Simultaneously," filed on Feb. 5, 2004.

FIELD OF THE INVENTION

The present invention relates to mobile communication devices, and more particularly to a method and system for automatically transmitting captured data from a communication device during an active communication session.

BACKGROUND OF THE INVENTION

Hand held communication devices, such as mobile telephones and PDAs, currently are adapted to incorporate a variety of functions and to support multiple mechanisms of communication. For example, a mobile phone can provide traditional wireless telephone functions, while also providing the ability for a user to capture digital images and the ability to transmit or receive captured images for display on the phone's LCD. Indeed, the modern mobile phone allows the user to send and receive text messages, audio and video clips, graphics and images via electronic mail, Short Message Service (SMS), or Multimedia Message Service (MMS), in addition to simply talking to another caller.

Each communication mechanism is associated with a particular addressing scheme, such as a phone number for phone calls, an email address for electronic messages, or an http URL for posting images. The personal communication devices that support a wide range of communication mechanisms generally treat each mechanism separately.

One primary limitation of conventional communication devices, such as camera phones, is that the devices lack the ability to allow the user to capture an image while the device is in communications mode, i.e., during a telephone call. For example, assume the user of the camera phone is having a telephone conversation with a friend and sees an object or scene nearby that the user thinks the friend may find of interest. With a conventional communication device, the user would be unable to snap a photo of the object or scene and send it to the friend contemporaneously with the telephone conversation.

Instead, today's communication device requires the user to implement two separate data exchange mechanisms, e.g., phone communication and electronic mail, and also require the user to know the caller's address scheme, e.g., phone number and email address, associated with each mechanism. In order to send a captured data to a phone call participant today, the user of the communication device would have to terminate the call, capture the image, setup the device to send an email message with the image as an attachment, provide or look-up the recipient's email address from the device's address book, transmit the email message, and then reestablish the telephone call with the recipient. Accordingly, while current communication devices support multiple communication mechanisms and integrate camera functionality, they require a significant amount of user interaction to utilize these mechanisms, which is cumbersome and inefficient.

Accordingly, a need exists for a method and apparatus that allows a user of a mobile communication device to capture an image during a phone conversation and to send the image to the phone call participant(s) with minimal user interaction. The present invention addresses such a need.

BRIEF SUMMARY OF THE INVENTION

The present invention provides a method for automatically sending a captured data to a phone call participant using a communication device having a data capture apparatus. Aspects of the present invention include initiating a communication session to a participant, such as a phone call; initiating a data capture event, such as capturing an image during the communication session; and automatically transmitting the captured data to the participant concurrently with the communication session.

According to the method and system disclosed herein, the preferred embodiment of the present invention allows a user of a mobile communication device to capture an image during a phone conversation and to send the image to the phone call participant(s) with minimal user interaction.

DETAILED DESCRIPTION OF THE INVENTION

The present invention relates to a communications device capable of capturing and transmitting data during a phone call and automatically transmitting the data to the participant from a communication device during an active communication mode. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a mobile communication device, e.g., a network enabled camera-phone, with an ability to capture a digital image during a telephone call with a participant, and to automatically transmit the image to the participant during the call. In operation, once the communication device detects that a phone call is in progress when an image is captured, the device automatically constructs a message (email, MMS, or other type) that includes the image. The communication device then sends the messages to the other participant(s) of the ongoing call.

Figure 1:
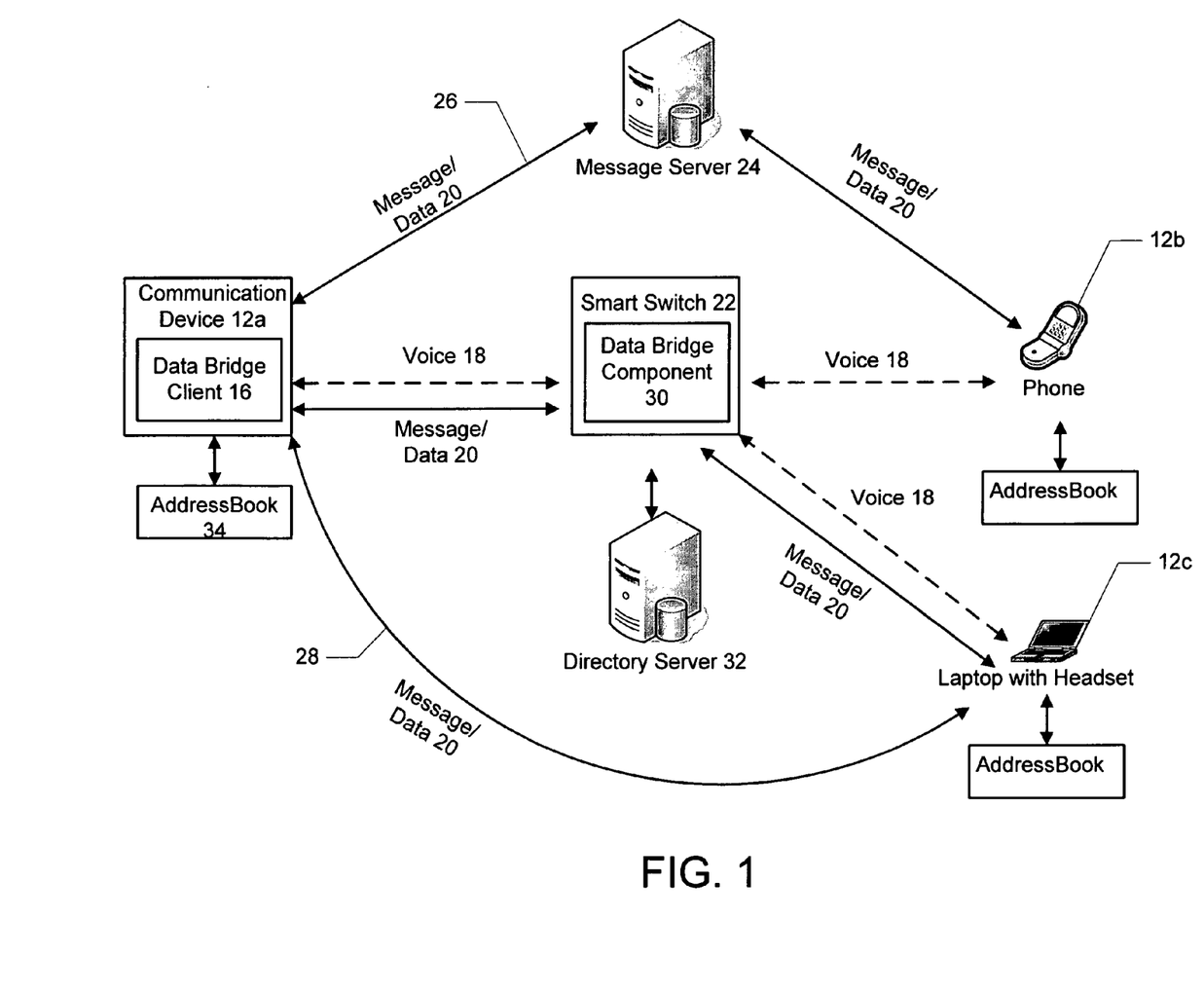
FIG. 1 is a block diagram illustrating an example network communication system for a preferred embodiment of the present invention.

FIG. 1 is a block diagram illustrating an example network communication system for a preferred embodiment of the present invention. The system 10 includes communication devices 12a-12c (collectively referred to as communication device 12), which are capable of participating in telephone communication in which voice data 18 is transmitted, and also capable of performing some type of data capture event, e.g., capturing a digital image.

According to a preferred embodiment of the present invention, each communication device 12 includes a data bridge client 16 that detects when the device 12 performs a data capture event while a communication session, such as a phone call, is being conducted between the communication device 12 and a phone call participant. In response to detecting the image capture event, the data bridge client 16 automatically generates a message that incorporates the data, and transmits the message/data 20 to the participant concurrently with the phone call.

In the preferred embodiment of the present invention, the data capture event is described primarily in terms of capturing the digital still image. However, image capture is just one data capture event that can cause the communication device 12 to respond by automatically integrating the captured data with an ongoing phone conversation. Examples of other data capture events include: movie capture, saving/closing of a document, opening of any viewable file/resource, including URL addressed resources, images, audio, games, and so on. For example, the communication device 12 of the present invention allows a user to invite a friend to play an online game by phoning the person and starting the game during the telephone call.

According to the present invention, addressing information for the message is determined by examining metadata regarding the phone call, including phone numbers of the participant, and any other information provided (names, IP addresses of the other devices if it's an IP call, etc.). In one preferred embodiment, the data bridge client 16 uses the phone call metadata to lookup addressing information related to the participant. In a second preferred embodiment, the client device 12 forwards the message/data 20 to a smart switch 22, which lookups the addressing information. In a preferred embodiment, the addressing information may be found from any number of available sources including, but not limited to:

User's local address book
User's remote address book
One or more directory services
Data available to the other call participants devices.

When the message/data 20 is received on a participating communication device 12b or 12c, the device, if equipped, recognizes that the message originated from another participant (using the call metadata, addressbook(s), and available directories), and presents the data to the user during the call in a manner appropriate for the data type. For example, an image is displayed on the screen of the electronic device 14 with any associated text sent by the sender.

The type of message constructed by the data bridge client 16 is determined by the capabilities of the device 12 (typically, email, MMS, or a direct connection to the other participant's devices). In a preferred embodiment, the message/data 20 is sent to the electronic device 14 through a smart switch 22, as shown. In an alternative embodiment, the message/data 20 may be sent through a message server 24 via line 26, or directly to the electronic device via line 28.

The smart switch 22 is a switch that has been provided with a data bridge component 30 and handles the routing of both voice and data for client communication device 12 if so enabled. When smart switching is enabled, the client device 12 forwards to message/data 20 to the smart switch 22 by addressing the message/data 20 with an address of the smart switch 22. The smart switch 20 then determines the address of the participant and forwards message/data 20.

The message/data 20 are transmitted over the network as follows. The two-way transmission of audio over either a packet-switch IP network (TCP/IP), which is referred to as IP telephony or "voice over IP" (VoIP), or the traditional public switched network (PSTN), use more than one connection or protocol. One is used for transport of voice and another is used for control signaling. For example, in IP telephony, transport is provided by User Datagram Protocol (UDP) over IP for voice packets and either UDP or TCP over IP for signals. Signaling commands to establish and terminate the call as well as provide all special features such as call forwarding, call waiting and conference calling are defined in a signaling protocol such as H.323, SIP, MGCP or MEGACO.

The data bridge component 30 in the smart switch 22 maintains session data to associate various messages 20 that pass through it and to keep track of the participants using the metadata associated with each session. The data bridge component 30 uses the transport connection associated with a particular call to open another channel to the participant of the call and forward the messages/data 20. With smart switching, all addressing is resolved by the smart switch 22, since it knows the address of all the call participants due to the end-to-end circuit of a phone call. For example, in IP telephony, the smart switch 22 has knowledge of the underlying transport (IP) address, which it uses to forward the message/data 20 to the participant. If the smart switch 22 cannot resolve an address of the participant, the smart switch 22 may use a directory server 32 to lookup a messaging address for the participant and automatically send the message by a messaging system. Such may be the case if the phone call takes place over a cell network, for instance.

As an example of the system 10 in operation, assume that a user of the communication device 12 has taken a picture during a telephone call handled by the smart switch 22. In response, the communication device 12 generates a message with the image and addresses the message using an address specified in the call metadata. In this case, the address is the address of the smart switch 22. Once the smart switch 22 receives the message/data 20, the smart switch 22 associates the data in the message with the ongoing call, and thus, can forward the data to the participants.

If smart switching in not available or one of the devices participating the call is unable to take advantage of smart switching, then the data 20 is sent through a messaging mechanism (e.g. email, MMS, etc). Note, that devices 14 that are equipped to associate incoming data with an ongoing call, may or may not be able to interoperate with the smart switch 22. The two features can be integrated for best performance, but they needn't be.

In a preferred embodiment, the message/data 20 are routed to at least one of the call participants. However, message/data 20 may be routed somewhere other than to the participating devices. For example, the message may be routed such that the data is automatically placed on a web server.

Figure 2:
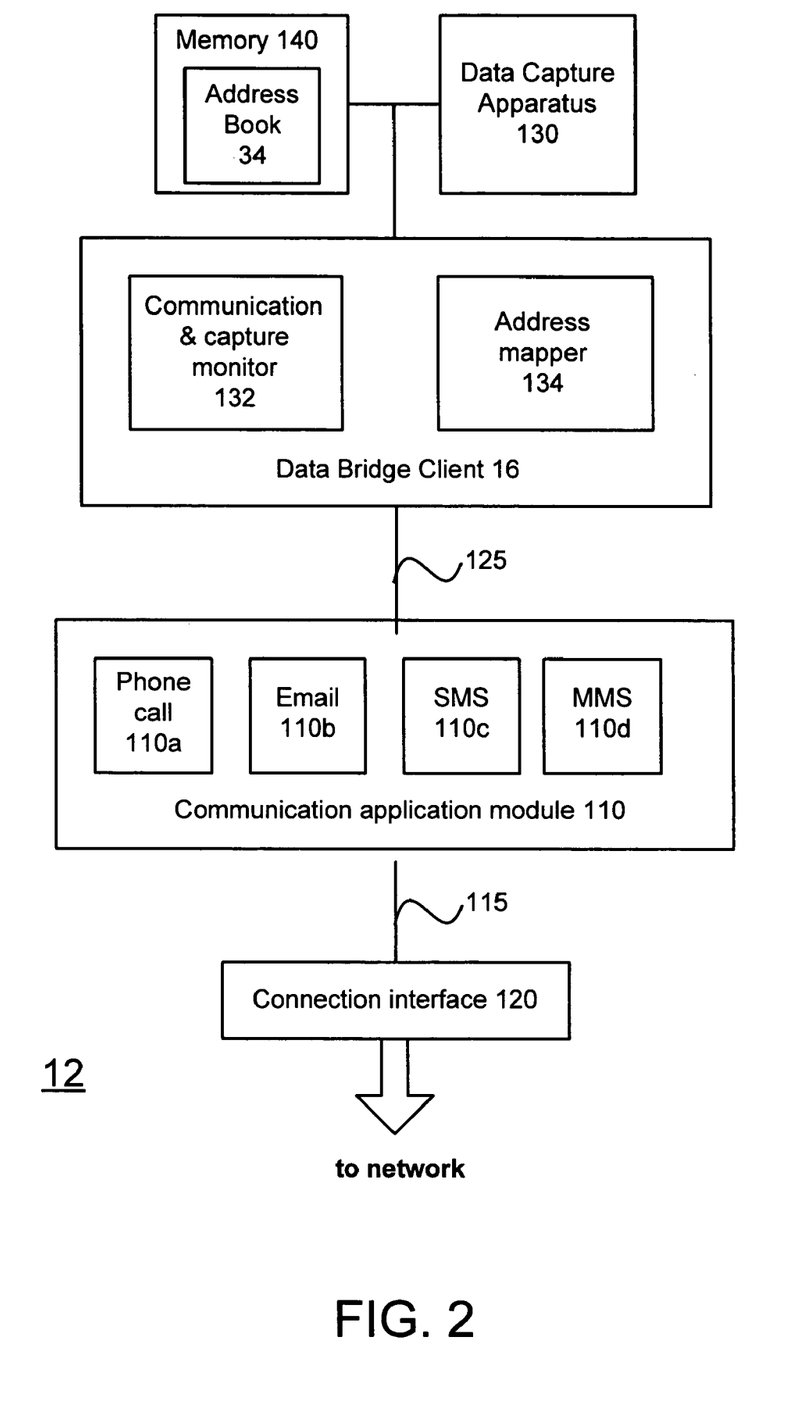
FIG. 2 is a block diagram illustrating the communication device according to a preferred embodiment of the present invention.

FIG. 2 is a block diagram illustrating the communication device according to a preferred embodiment of the present invention. The communication device 12 includes memory 140, a data capture apparatus 130, a communication application module 110, a connection interface 120, and the data bridge client 16. Preferably, the communication device 12 is one that supports at least two communication modes, such as the following, for example:

Initiate and receive phone calls
Email

SMS

MMS

Initiate and receive direct network connections

Initiate and receive other datagram/packet type exchanges

Each communication mode is controlled by a corresponding communication applications 110a-110d in the communication application module 110. While four communication applications are shown in FIG. 2, those skilled in the art readily appreciate that other communication devices can support additional communication applications, and that the present invention is not intended to be limited in this manner. The communication application module 110 is in communication with the connection interface 120, via a bus 115, for example. The connection interface 120 enables data transmission to another communication device on a network (not shown). There are a number of standard connection interfaces 120 depending on the programming languages. Two such interfaces include a socket interfaces for C/C++ program code and a java.net interface for Java program code, for example. The connection interface 120 is well known to those skilled in the art and is beyond scope of this description.

The data capture apparatus 130 may include one or more hardware devices and accompanying software that is coupled to or integrated with the communication device 12 for capturing data of some sort. Examples of a data capture apparatus 130 include a charge coupled device (CCD) for capturing digital still images and/or video, a microphone, a scanner, user interface keys, programmable soft keys, and a touch-screen.

The data bridge client 16 of the present invention is in communication with the communication application module 110 and the data capture apparatus 130 via data bus 125 for example. The data bridge client 16 includes a communication and data capture monitor 132 and an address mapper 134. The communication and data capture monitor 132 is primarily responsible for detecting when a communication session, such as a phone call, is ongoing at any given time, and for detecting data capture events. In the preferred embodiment, the phone call application 110a, notifies the data bridge client 16 when the user invokes the application 110a to initiate a phone call. When the communication session is completed, the application, e.g., 110a, similarly informs the data bridge client 16. In a further preferred embodiment, the data bridge client 16 is capable of identifying any communications that are ongoing at any given time, e.g., instant messaging. In this embodiment, the data bridge client 16 keeps track of which applications 110a-110d are being utilized at any given time. In addition, when the data capture apparatus 130 is invoked based on user input for a data capture event, the communication and data capture monitor 132 is notified.

The address mapper 134 is primarily responsible for returning addresses and connection setup information, i.e., communication information, to the data bridge client 16. Together, the communication and data capture monitor 132 and the address mapper 134 of the data bridge client 16 enable the device 12 to automatically transmit data captured by the communication device 12 during a phone call made by a communication device to the call recipient.

Figure 3:
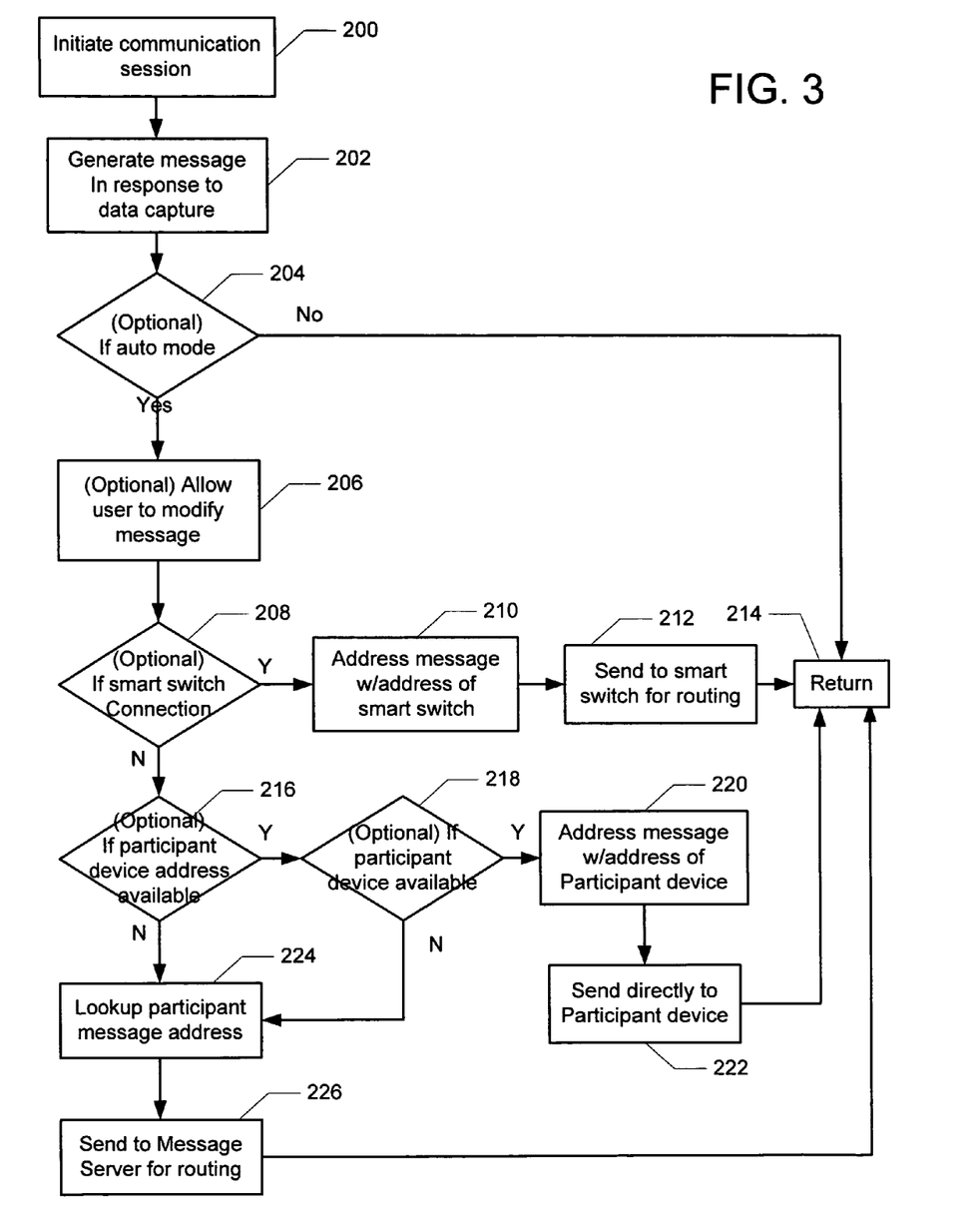
FIG. 3 is a flow diagram illustrating the process for automatically transmitting data captured during a phone call made in accordance with a preferred embodiment of the present invention.

FIG. 3 is a flow diagram illustrating the process the communication device performs for automatically transmitting data captured during a phone call in accordance with a preferred embodiment of the present invention. The process begins in step 200 when the communication and data capture monitor 132 is notified that a phone call (or other communication session) has been initiated. In response to the communication and data capture monitor 132 being notified of a data capture event during the phone call, the data bridge client 16 generates a message and incorporates the capture data into the message, preferably as an attachment, in step 202. If the communication device 12 is configured to automatically send captured data to the phone call participant/recipient in step 204, then the communication device 12 optionally allows the user to modify the message in step 206.

If smart switching is enabled in step 208, then the message is addressed with an address of the smart switch 22 in step 210. The message is then transmitted to the smart switch 22 for routing in step 212. In step 214, the data bridge client 16 returns control to the communication device 12.

In a preferred embodiment, the address of the switch is determined by querying the address mapper 134 for the communication information necessary to transmit the message. Such a query may include a parameter that indicates that smart switching is enabled, in which case the address mapper 104 may be configured to automatically return the address of the smart switch 22.

If smart switching is not enabled in step 208, then the data bridge client 16 optionally determines whether the participant's device address is available in step 216. If the participant's device address is available and the participant's device is available, e.g., accepting connections, in step 218, then the message is addressed with the message address of the participant's device in step 220. The data bridge client 16 then sends the message directly to the participant's device in step 220 and control is returned to the device 12 in step 214.

If the participant's device address is not available in step 216 or the participant's device is not available in set 218, then the data bridge client 16 looks up the participant's message address in step 224. The data bridge client 16 then sends the message to the message server 24 (FIG. 1) for routing to participant in step 226, and control is returned to the device 12 in step 214.

In a preferred embodiment, the communication and data capture monitor 132 requests address information for the participant from the data bridge client 16, optionally specifying the types of addresses supported. The data bridge client 16 examines metadata associated with the call. If the call is a smart switch connection, the smart switch connection is returned. If the participant's device address is available it is also returned. If the neither the smart switch address nor the participant's device address is available, or if the request is for a different address type, the data bridge client 16 uses call metadata to send a query to the address mapper 134 to perform a lookup using one or more directories, local or remote, to retrieve communications information for one or more message types associated with for the call participant. Such a query includes the communication information used to establish the ongoing session as an input parameter and the related addressing information for the second communication application, e.g., SMS or MMS, as an output parameter. In response, the address mapper 134 may retrieve and return the related address information by accessing the address book 34 stored in memory 140.

In a preferred embodiment, each entry in the address book 34 is associated with a participant/recipient. Each entry may include any communication information, e.g., address and connection setup information, needed to establish any supported mode of communication with the associated recipient. The communication information can be specific to the recipient or to a communication device associated with that recipient, or to an individual, or organization associated with recipient. For example, communication information 302 specific to the recipient may include the instant messaging and the email addresses of the recipient and the recipient's personal website URL, while communication information specific to the device may include the device's phone number and the IP address associated with the device. Communication information specific to an associated individual or organization can include the recipient's supervisor, etc. What should be clear is that the user is allowed to define the related communication information 302 in the address book, or for in whatever manner he or she wishes. Note that the entries in address book 34 may include dynamic, as well as static addressing information. An example of a dynamic address includes an IP address dynamically assigned to a device using DHCP for IP address assignment.

Figure 4:
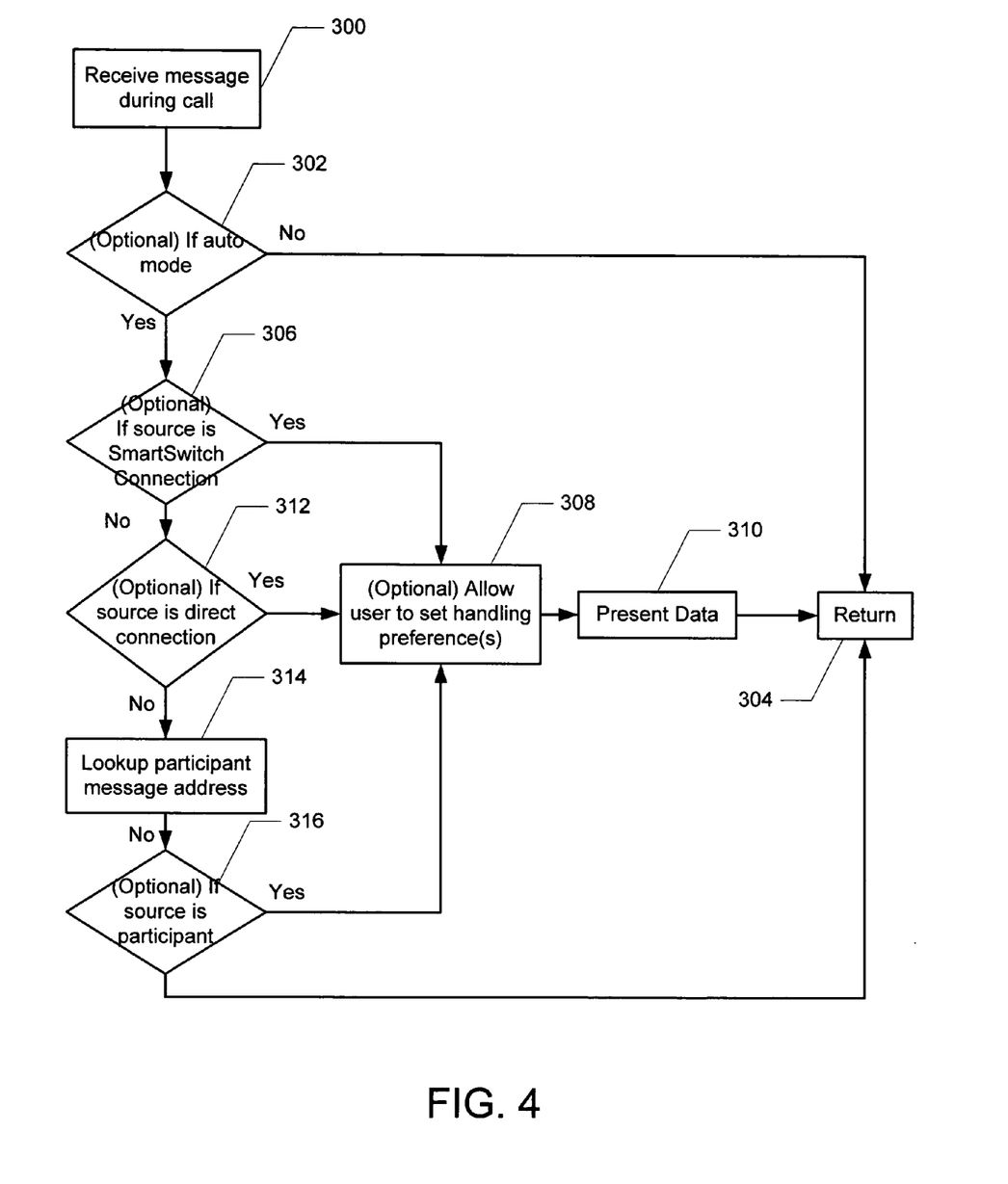
FIG. 4 is a flow diagram illustrating the process performed by the communication device when receiving the message in a preferred embodiment of the present invention.

FIG. 4 is a flow diagram illustrating the process performed by the communication device 12 when receiving the message in a preferred embodiment of the present invention. The process begins in step 300 when the communication device 12 receives the message/data 20 during an ongoing phone call. If the communication device 12 is not configured to automatically present the data in the message in step 302, then the data bridge client 16 returns control to the communication device 12 in step 304.

If the communication device 12 is configured to automatically present the data in the message in step 302, then it is optionally determined in step 306 whether the source of the message is smart switch 22. If the source is smart switch 22, then in step 308 the user is optionally allowed to set handling preferences. The data is then extracted from the message and presented to the user, e.g., the image is displayed, even if the phone call is ongoing in step 310.

If the source of the message is not a smart switch 22 in step 306, then in step 312 is determined if the source is a direct connection. If the source is a direct connection, then process continues with steps 308 and 310. If the source is not a direct connection in step 312, then in step 314 the data bridge client 16 looks up the message address of the sender. If the data bridge client 16 determines from the message address of the sender that the sender is a participant to the ongoing call in step 316, then the process continues with steps 308 and 310. Otherwise, the data bridge client 16 returns control to the communication device 12 in step 304.

A method and apparatus has been disclosed for capturing an image with a communication device during a phone call initiated by the device, and for automatically transmitting the captured image to the participant/recipient of the call while the call is ongoing.

Although the present invention has been described in terms of a preferred embodiment where data is captured and sent concurrently with a phone call, the data may be captured and sent during any communication mode, such as a text messaging session, for example.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for automatically sending captured data to a voice communication session participant using a mobile communication device having a data capture apparatus, comprising:
    initiating a voice communication session to a participant while the mobile communication device is operating in a mode capable of performing a data capture event;
    detecting when the mobile communication device performs the data capture event;
    determining that the voice communication session between the mobile communication device and the participant is being conducted when the device performs the data capture event;
    in response to detecting the data capture event, automatically generating a message that includes data from the data capture event and automatically transmitting the message and captured data to the participant independent of user input concurrently with the voice communication session; and
    receiving a message containing captured data from a second mobile communication device during the voice communication session, and for presenting the captured data during the voice communication session.

2. The method of claim 1 wherein the voice communication session comprises a phone call.

3. The method of claim 1 further comprising: detecting an image capture event during the phone call, wherein the captured image is automatically transmitted to the participant.

4. The method of claim 1 wherein the data capture event comprises at least one of movie capture, saving/closing of a document, and opening of any viewable file/resource, including URL addressed resources, images, audio, and games.

5. The method of claim 4 further comprising: determining addressing information for the participant by examining metadata regarding the telephone call and using the phone call metadata to lookup addressing information related to the participant.

6. The method of claim 5 further comprising: looking up the addressing information by using at least one of a user's local address book, a user's remote address book, a directory service, and data available to the other call participants devices.

7. The method of claim 5 further comprising: using the phone number from the call metadata to lookup addressing information related to the participant.

8. The method of claim 1 further comprising: transmitting the captured data to a switch that handles routing of both voice and data for the mobile communication device and that is configured to lookup addressing information related to the participant and for sending the message to the participant.

9. The method of claim 8 further comprising: configuring the switch to use a transport connection associated with the phone call to open another channel to the participant of the call and to forward the message.

10. The method of claim 1 further comprising: transmitting the data to the participant using a data communication session concurrent with the voice communication session.

11. The method of claim 10 further comprising: configuring the mobile communication device to support at least two communication modes, including phone calls, e-mail, SMS, MMS, direct network connections, and datagram/packet type exchanges.

12. A network-enabled mobile communication device having a data capture apparatus, comprising:
    means for initiating a voice communication session to a participant while the mobile communication device is operating in a mode capable of performing a data capture event;
    means for detecting that a voice communication session with at least one participant is in progress;
    means for capturing data during the voice communication session;
    means for determining that the voice communication session between the mobile communication device and the at least one participant is being conducted when means for capturing data performs a data capture event;

means responsive to the determining means for automatically constructing a message that includes the captured data independent of user input;

means responsive to the determining means for automatically transmitting the message to the at least one participant independent of user input during the voice communication session; and means for receiving a message containing captured data from a second mobile communication device during the voice communication session, and for presenting the captured data during the voice communication session.

13. The mobile communication device of claim 12 wherein the mobile communication device comprises a camera phone.

14. The mobile communication device of claim 13 wherein the mobile communication device supports at least two communication modes for initiating respective communication sessions, including phone calls, e-mail, SMS, MMS, direct network connections, and datagram/packet type exchanges.

15. The mobile communication device of claim 14 wherein the data capture means includes at least one of a digital still image capture device, a microphone, a scanner, user interface keys, programmable soft keys, and a touchscreen.

16. The mobile communication device of claim 15 wherein the captured data comprises a digital still image.

17. The mobile communication device of claim 16 wherein the determining means comprises a data bridge client for determining that means for capturing data performs the data capture event during the voice communication session, and for automatically generating and transmitting the message including the captured data.

18. The mobile communication device of claim 17 wherein the data bridge client further includes means for transmitting the message to a switch that is configured to address the message to the participant and forward the message to the participant.

19. A method for automatically sending a captured image to a voice communication session participant using a mobile communication device having an image capture apparatus, the method comprising:

establishing a voice communication session between a user of the mobile communication device and a participant via a first communication application supported by the mobile communication device while the mobile communication device is operating in a mode capable of capturing an image;

capturing the image with the image capture apparatus in response to user input;

determining that the voice communication session between the user and the participant is being conducted when the image capture apparatus captures the image;

in response to capturing the image, automatically generating a message that includes the captured image and automatically transmitting the message and image to the participant independent of user input via a second communication application during a data communication session concurrent with the voice communication session;

in response to invoking the second communication application, automatically retrieving communication information related to the participant and necessary to establish the concurrent communication session via the second communication application; and receiving a message containing captured data from a second mobile communication device during the voice communication session, and for presenting the captured data during the voice communication session.

20. The method of claim 19 further including: automatically determining addressing information for the image transmission by examining metadata regarding the voice communication session.

21. The method of claim 20 further including: providing a phone call as the voice communication session and providing messaging as the data communication session.

22. A computer-readable medium containing programming instructions for automatically sending captured data to a communication session participant using a mobile communication device having a data capture apparatus, the program instructions for:

initiating a communication session to a participant while the mobile communication device is operating in a mode capable of performing a data capture event;

detecting when the mobile communication device performs the data capture event;

determining that the communication session between the mobile communication device and the participant is being conducted when the device performs the data capture event;

in response to detecting the data capture event, automatically generating a message that includes data from the data capture event and automatically transmitting the message and captured data to the participant independent of user input concurrently with the communication session; and receiving a message containing captured data from a second mobile communication device during the voice communication session, and for presenting the captured data during the voice communication session.

23. The computer-readable medium of claim 22 wherein the communication session comprises a phone call.

24. The computer-readable medium of claim 22 further comprising program instructions for: detecting an image capture event during the phone call, wherein the captured image is automatically transmitted to the participant.

25. The computer-readable medium of claim 22 further comprising program instructions for: enabling the data capture event to comprise movie capture, saving/closing of a document, or opening of any viewable file/resource, including URL addressed resources, images, audio, and games.

26. The computer-readable medium of claim 25 further comprising program instructions for: determining addressing information for the participant by examining metadata regarding the telephone call and using the phone call metadata to lookup addressing information related to the participant.

27. The computer-readable medium of claim 26 further comprising program instructions for: looking up the addressing information by using at least one of a user's local address book, a user's remote address book, a directory service, and data available to the other call participants devices.

28. The computer-readable medium of claim 27 further comprising program instructions for: using the phone number from the call metadata to lookup addressing information related to the participant.

29. The computer-readable medium of claim 22 further comprising program instructions for: transmitting the captured data to a switch that handles routing of both voice and data for the mobile communication device and that is configured to lookup addressing information related to the participant and for sending the message to the participant.

30. The computer-readable medium of claim 29 further comprising program instructions for: configuring the switch to use a transport connection associated with the phone call to open another channel to the participant of the call and to forward the message.

31. The computer-readable medium of claim 22 further comprising program instructions for: transmitting the data to the participant using a data communication session concurrent with the voice communication session.

32. The computer-readable medium of claim 31 further comprising program instructions for: configuring the mobile communication device to support at least two communication modes, including phone calls, e-mail, SMS, MMS, direct network connections, and datagram/packet type exchanges.

* * * * *

UNITED STATES PATENT AND TRADEMARK OFFICE
CERTIFICATE OF CORRECTION

PATENT NO. : 7,489,925 B2
APPLICATION NO. : 10/884250
DATED : February 10, 2009
INVENTOR(S) : Ryan Fry Page 1 of 1

It is certified that error appears in the above-identified patent and that said Letters Patent is hereby corrected as shown below:

In The Claims:

Claim 1, Column 8, line 13, replace ", and for" with --and--

Claim 19, Column 9, line 66, replace ", and for" with --and--

Claim 22, Column 10, line 31, replace ", and for" with --and--

Signed and Sealed this
Twenty-second Day of May, 2012

David J. Kappos
*Director of the United States Patent and Trademark Office*